United States Patent
Everhardt et al.

[11] 3,920,498
[45] Nov. 18, 1975

[54] METHOD AND APPARATUS FOR RETREADING PNEUMATIC TIRES

[75] Inventors: William F. Everhardt; Henry L. Brown, Jr., both of Macon, Ga.

[73] Assignee: American Power Tread Corporation, Macon, Ga.

[22] Filed: Oct. 4, 1974

[21] Appl. No.: 512,088

[52] U.S. Cl............ 156/96; 156/128 R; 156/394 R; 264/319; 264/326; 425/17; 425/40; 425/47; 425/32; 425/44; 425/46; 432/225
[51] Int. Cl.$^2$.. B29H 5/01; B29H 5/04; B29H 17/36
[58] Field of Search.......... 156/394 FM, 128 R, 96; 264/310; 425/40; 432/225

[56] References Cited
UNITED STATES PATENTS

| | | | |
|---|---|---|---|
| 1,450,328 | 4/1923 | Midgley | 425/39 |
| 2,014,010 | 9/1935 | Wheatley | 156/394 FM |
| 2,157,967 | 5/1939 | Riccio | 425/23 |
| 2,405,802 | 8/1946 | Taber | 264/310 |
| 2,774,409 | 12/1956 | Skidmore | 156/96 |

FOREIGN PATENTS OR APPLICATIONS

| | | | |
|---|---|---|---|
| 562,232 | 8/1958 | Canada | 156/96 |

*Primary Examiner*—Clifton B. Cosby
*Attorney, Agent, or Firm*—Shlesinger, Arkwright, Garvey & Dinsmore

[57] ABSTRACT

A method and apparatus for retreading pneumatic tire casings with a prevulcanized rubber tread strip using a heat curable adhesive. The tire is mounted on a tire rim, a layer of the adhesive positioned around the periphery of the tire, and the tread strip is placed over the adhesive. The composite is then positioned within a pressure ring and inflated against the ring so that the tread strip is pressed against the tire casing. Subsequently, the assembly is placed in a heating chamber according to this invention and heated air is circulated about the tire. A plurality of tires may be cured simultaneously.

35 Claims, 8 Drawing Figures

_3,920,498_

METHOD AND APPARATUS FOR RETREADING PNEUMATIC TIRES

This invention relates to a process and apparatus for retreading pneumatic tire casings, and more particularly to an improved process and apparatus wherein the tires may be retreated more efficiently and more rapidly than prior art processes.

BACKGROUND AND OBJECTS

This invention deals with the so-called "cold retreading" system of renewing the riding surface of pneumatic tires. In such a process, a worn out tire is subjected to a buffing operation wherein the tread surface is completely removed and the outer periphery of the tire is roughened preparatory to retreading. Next, a layer of "cushion gum" is positioned around the periphery of the tire. The cushion gum is an adhesive system used for bonding a new tread strip to the tire carcass. Typically, one component of the adhesive system is placed on the periphery of the tire carcass and the underside of the tread strip, and the second component of the adhesive system is coated on the surface of a thin, unvulcanized layer of rubber which is positioned between the tread strip and the carcass.

Then, the composite is placed in a suitable pressure chamber such as an autoclave and subjected to a high pressure on the order of 4–10 atmospheres and a relatively "cold" temperature of less than about 300°F. After a period of time, the tire is removed from the autoclave and cooled at which point the adhesive is cured and thereby provides a good bond between the new tread strip and the tire carcass. The time required for the curing may be as much as 5 hours. Such a process is disclosed in U.S. Pat. No. 2,976,910.

In such a process, an annular pressure band is often applied over the tread strip around the circumference of the tire, and one such band is shown in Canadian Pat. No. 562,232. Such a band is flat and has a ratchet device for tightening the band about the tire.

The cold vulcanizing process is distinguished from a hot retreading process wherein a layer of unvulcanized rubber is positioned around the periphery of the tire carcass and a tread pattern is molded into the rubber simultaneously with the curing thereof. Such a process is typically carried out at a considerably higher temperature usually in excess of 500°F.

The cold retreading process has become quite popular in recent years since it provides a high quality recapped tire with good bond strength between the tread strip and the carcass. However, the apparatus used in this type of process has at best been somewhat crude and inefficient. For example, the autoclaving of large truck tires requires a considerable expenditure in terms of energy requirements, and usually only one tire is cured in a vessel at a time.

The present invention provides a method and apparatus wherein a plurality of tires may be simultaneously cured in a very efficient manner, thus materially improving the output of the recapper.

Accordingly, a primary object of this invention is to overcome the disadvantages of the prior art recapping methods and apparatus.

Another object of this invention is to provide an improved efficient method for recepping tires.

Still another object of this invention is to provide an apparatus for simultaneously curing the adhesive in a plurality of tires.

A further object of this invention is to provide an improved pressure ring for use in the cold retreading process.

Yet another object of this invention is to provide an apparatus for curing the adhesive used in a cold retreading process which has a maximum efficiency in terms of energy requirements.

Still another object of this invention is to provide a method for "cold recapping" of pneumatic tires wherein heated air is circulated around the tire being cured.

These and other objects and advantages of this invention will become apparent when considered in light of the following description and claims when taken together with the accompanying drawings in which:

DESCRIPTION OF THE INVENTION

Figure 1:
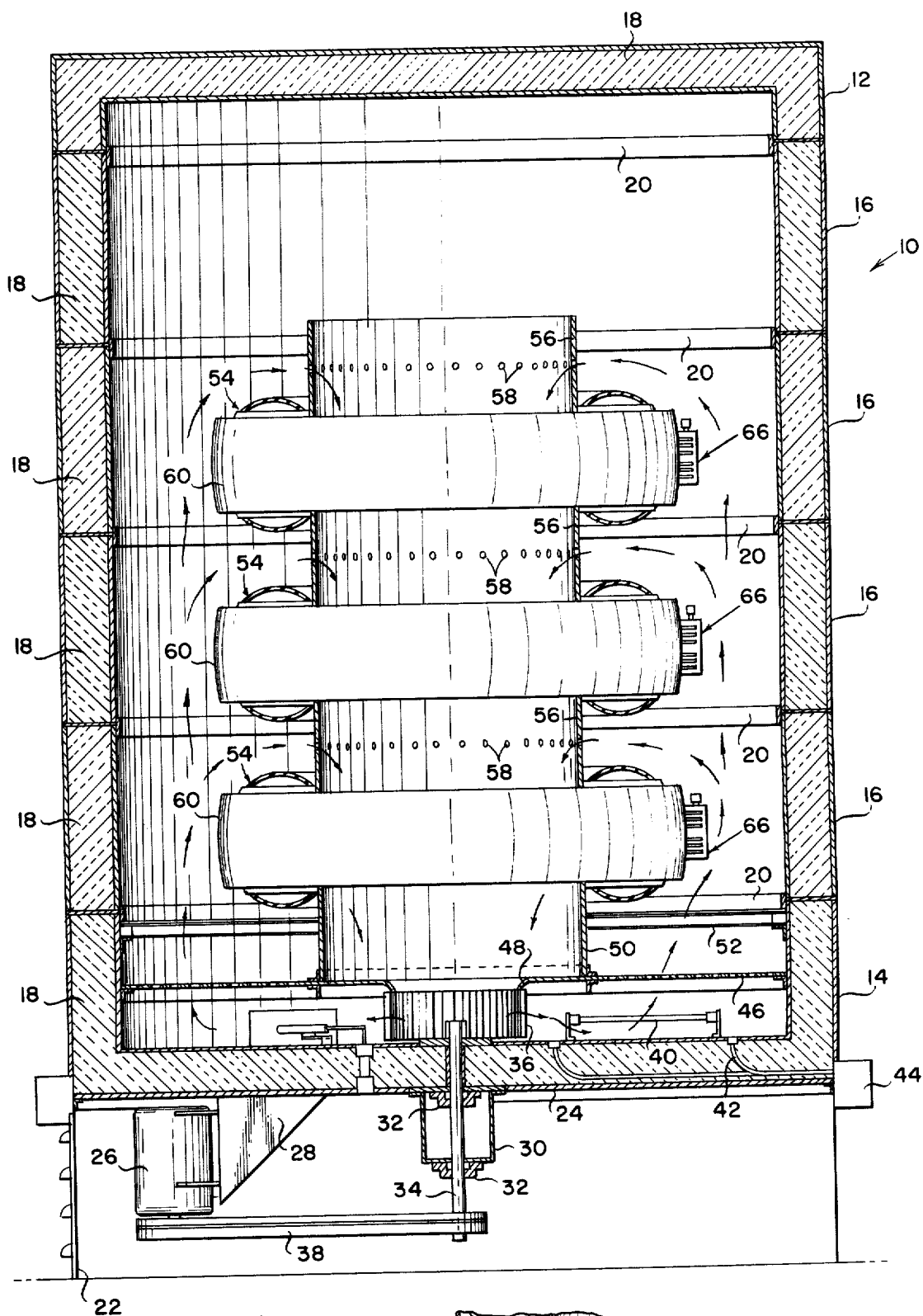
FIG. 1 is a vertical sectional view through the apparatus of this invention.
Figure 1A:
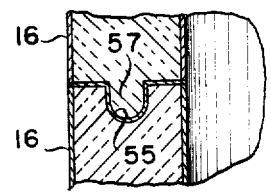
FIG. 1a is an enlarged fragmentary sectional view showing a modified joint of the apparatus of FIG. 1.

Referring now to FIG. 1, the curing chamber generally designated 10 is seen to include a top member 12, a bottom member 14, and a plurality of intermediate members 16. Each of the members 12, 14 and 16 is a circular in cross-section, and the inner and outer walls are separated by insulation 18. Along the upper edge of each of the intermediate members 16 and the bottom member 14 is attached a circular band 20 which serves to position each of the members vertically above the next lower member. For this reason, the circular bands 20 extend slightly above the top surface of the members.

Figure 2:
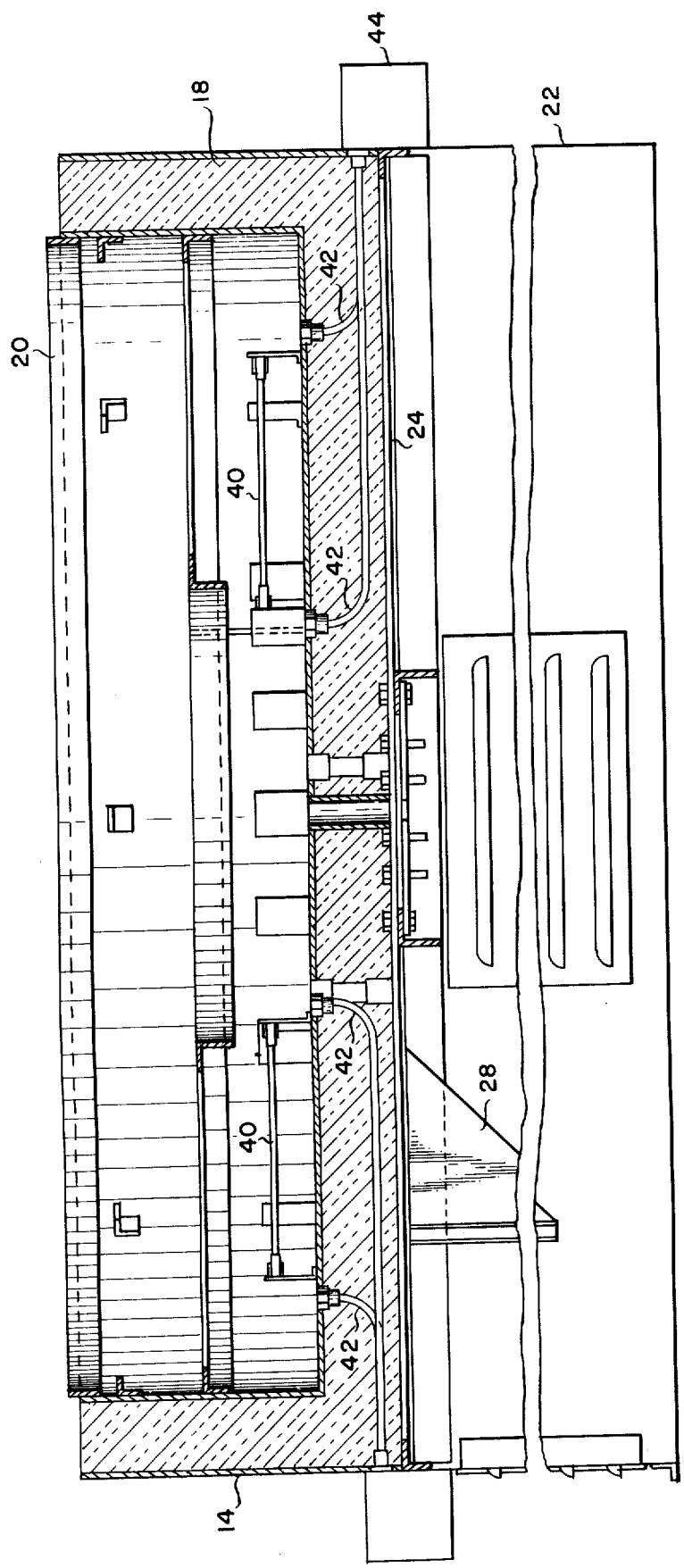
FIG. 2 is a vertical sectional view of the base member used in the apparatus of this invention.

Referring now to FIG. 2, the bottom member 14 is seen to include an annular depending flange 22 which serves as a base for supporting the apparatus. A plate 24 is secured to the member 14, and an electric motor 26 is bolted to the plate 24 by means of a bracket 28.

Also secured to the plate 24 is a bracket 30 which contains bearings 32 which in turn mount shaft 34. Shaft 34 passes through the insulation 18 and on the upper end thereof, a squirrel cage type blower 36 is secured. Blower 36 and shaft 34 are driven by motor 26 through a belt drive 38.

Mounted above the insulation 18 in the bottom member 14 are a plurality of quartz lamps 40. It has been found desirable to use 12 such lamps radially spaced around the member 14. The lamps are preferably 230 volts, single phase 1500 watt lamps, and are radially disposed and positioned at approximately 30° intervals around the chamber. These lamps have been found to provide excellent long-term life and are capable of producing a high degree of heat.

The lamps are wired to a source of electric current, and the wiring passes through tubes 42 and through a wiring trough 44.

The blower 36 is of the type which utilizes an axial intake radial discharge. Positioned directly above the blower 36 is a baffle plate 46. This plate has a venturi like opening 48 which opens into the center of the blower 36. The plate 46 is foraminous in nature and should be of a heavy guage metal. A support ring 50 is secured to the baffle plate 46 as illustrated. An additional baffle plate 52 is also provided. Baffle plates 46 and 52 serve to uniformly distribute the air passing therethrough.

Each of the intermediate members 16 is identical, and for this reason, any number of these members may be utilized. Thus, if only a single tire is being cured, only one intermediate member would be utilized. The maximum number of such members 16 is usually determined by the height of the room in which the apparatus is installed. In the drawings, FIG. 1 shows four such intermediate members 16 with three tires 54 in the chamber 10.

Between each of the tires 54 is a spacer ring 56 which serves to vertically space the tires within the chamber 10. The rings 56 are provided with a plurality of holes 58 to allow passage of air therethrough. One tire has been removed from the stack of tires as shown in FIG. 1 for illustration purposes only. Thus, it is not necessary to have a spacer ring above the uppermost tire. Each of the tires 54 is encircled by a pressure ring 58 which will be described in more detail hereinafter.

In use, blower 36 draws air downwardly through the stack of tires 54 from the top and through the perforations 58, and blows air radially outwardly over the lamps 40 and upwardly through baffle plates 46 and 52 whereby the heated air is evenly distributed. In this manner, the heated air is forced over the entire periphery as well as the sidewalls of the tires 54. In this manner, very uniform heating of the tire is attained.

In an alternate construction of the heating chamber 10, the intermediate members 16 are provided on their upper surface with a groove 15 and on their lower surface with a tongue 57. This tongue-and-groove construction provides a mating of the stacked members and positions them in proper alignment. In this manner, the circular bands 20 may be eliminated. However, either of these alternative constructions provides a suitable seal for heat retention purposes.

Figure 3:
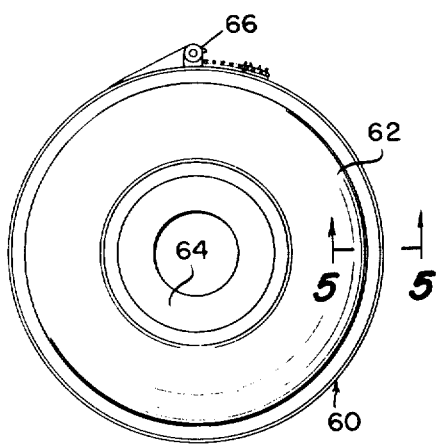
FIG. 3 is a side elevational view of the pressure ring of this invention as shown mounted on a tire.

Referring now to FIGS. 3–7, the pressure ring used in the process of this invention will now be described. FIG. 3 illustrates a tire 62 mounted on a rim 64 and encircled by the pressure ring 60. An adjustment mechanism 66 is provided for adjusting the diameter of the pressure ring in accordance with the tire being retreaded.

Figure 5:
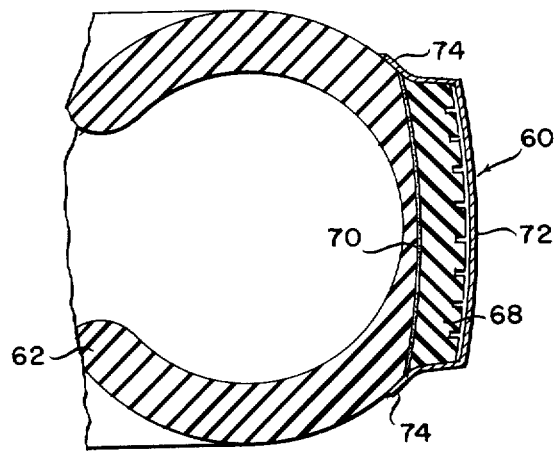
FIG. 5 is a sectional view along line 5—5 of FIG. 3 and viewed in the direction of the arrows.
Figure 4:
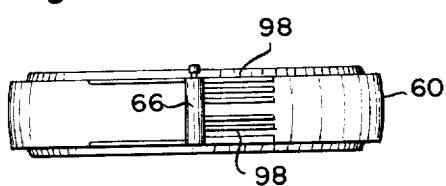
FIG. 4 is a top plan view of the pressure ring of FIG. 3.

As best seen in FIG. 5, the tread strip 68 is positioned on the tire 62 with the cushion gum layer 70 therebetween. The pressure ring 60 includes a portion 72 which is slightly arcuate and thereby similar to the shape of the completed tire. Extending radially inwardly from the arcuate portion 72 are side flanges 74 which extend beyond the cushion gum layer and over a portion of the sidewall of the tire. In this manner, when the tire is inflated and during the curing process, it is not possible for the tread strip to slip or shift its position relative to the tire carcass. This has been a severe disadvantage in prior art pressure rings which have generally been flat and only covered the outermost portion of the tread strip, and not the sides of the tread strip or the sidewalls of the tire. Since the pressure ring 60 is of a one-piece construction, it securely positions the tread strip 68 on the tire 62 so that a positive bond is attained between the tread strip and the tire carcass. The pressure ring 60 is preferably of stainless steel, but may be of other suitable heat resistant metal. The pressure ring may be formed by a spinning process well known in the metal forming field.

Figure 6:
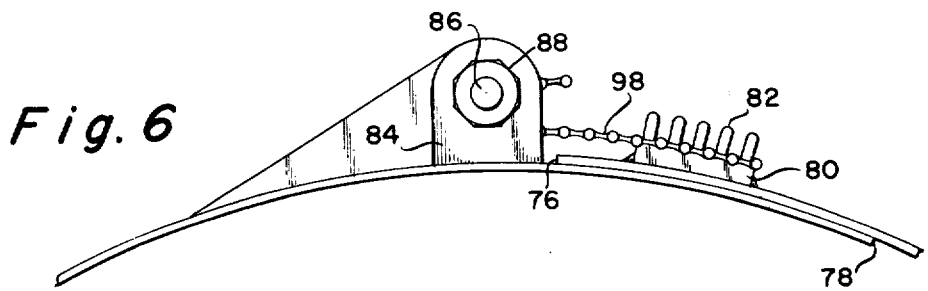
FIG. 6 is an enlarged side elevational view of the adjusting means of the pressure ring of this invention.

The ends 76 and 78 of the pressure ring 60 overlap as best seen in FIG. 6. Secured to the end 76 is a bracket 80 having a plurality of teeth 82 extending outwardly therefrom.

Figure 7:
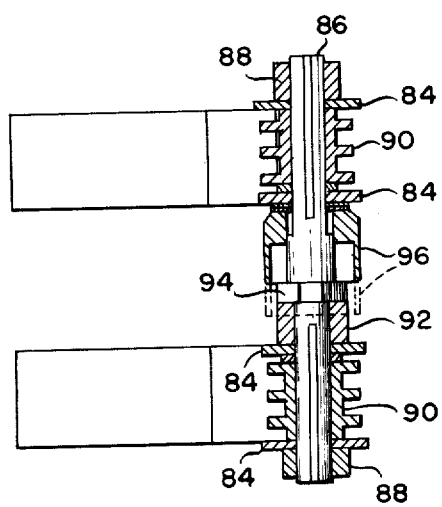
FIG. 7 is a sectional view of the adjusting and locking means of the pressure ring of this invention.

On the end 78 of the pressure ring 60, are mounted four support brackets 84 which are preferably welded to the pressure ring 60. The brackets 84 support a shaft 86 for rotation therein, and the shaft 86 has hexagonal nuts 88 secured to each end thereof. Also mounted on the shaft 86 are two sprockets 90 which are preferably splined or keyed to the shaft 86 for rotation therewith. The shaft 86 passes through a hexagonal nut 92 which is welded or otherwise fastened to one of the brackets 84, and the shaft 86 is free to rotate within the nut 92. A second nut 94 is secured to the shaft 86 for rotation therewith as by welding, splines or the like, and it is therefore also free to rotate with respect to nut 92. A socket 96 is freely slideable on the shaft 86 and is of a size such that when it is moved downwardly as seen in FIG. 7, it may engage both nuts 92 and 94. Also, when moved upwardly as seen in FIG. 7, the socket 96 is free from both nuts 92 and 94. In this manner, when the socket 96 is moved downwardly as seen in FIG. 7, it will engage both nuts 92 and 94 and because of its hexagonal internal configuration, will prevent relative rotation of nuts 92 and 94 and thereby lock shaft 86 in the desired position. The socket 96 is preferably a "12 point" socket, and will thereby provide a great degree of adjustment.

A pair of chains 98 are wrapped around the sprockets 90 and are of a length such that they may engage the teeth 82 of the bracket 80, and be removable therefrom.

In order to recap a tire according to the method and using the apparatus of this invention, the tire carcass is first buffed in the conventional manner. Next, the adhesive layer is provided on the periphery of the buffed tire carcass, and the prevulcanized tread strip is placed thereover and the ends cut to the proper length for a butt joint. Next, with the chain 98 removed from the teeth 82, the pressure ring 60 is placed around the tire by spreading the ends 76 and 78 of the pressure ring out of the normal plane of the pressure ring and thereby twisting the pressure ring slightly. The ring may then be placed around the tire with the ends 76 and 78 overlapping as seen in FIG. 6. The chains 98 are then placed over the teeth 82, and by means of a suitable socket wrench engaging either of the nuts 82, and with the socket 96 in the position shown in FIG. 7, the shaft 86 is rotated in a direction as to draw the ends 76 and 78 into a more overlapping position thus tightening the pressure ring about the tire. With the tire deflated, the pressure ring is drawn tightly thereabout, and when it is tightened, the socket 96 is moved to the dotted line position of FIG. 7, thereby locking the pressure ring at the desired diameter. Next, the tire is inflated to a pressure of at least normal operating pressure. The most common truck tire size is 1000 × 20 and for the tire, an inflation pressure of about 100 psi has been found suitable. Although the pressure can be lower or greater, this pressure has been found suitable for this size tire. Of course for different size tires, different pressures are utilized, but should be at least as great as normal operating pressure.

The tire or tires having the pressure ring thereabout are then placed in the heating chamber 10 in a vertically stacked arrangement as shown in FIG. 1 and separated by the spacer rings 56. The intermediate rings 16 are used to the extent necessary as determined by the number of tires being heated. With the top member 12 placed on the uppermost intermediate member, the apparatus is ready to be started.

First the motor 26 is turned on to establish an air flow as indicated by the arrows in FIG. 1, and the lamps 40 are then turned on by means of suitable external controls (not shown). Desirably, the lamps are connected in four thermostatically controlled circuits of four, four, two and two lamps each. In this manner, two, four, six, eight, ten or all twelve lamps may be operated at a given time. Initially, all lamps are turned on to bring the temperature inside the chamber up to approximately 300°F. This heat up period will take generally 15 to 45 minutes depending upon the number of tires in the chamber. When the temperature inside the chamber reaches 300° the thermostat automatically turn off certain of the lamps as needed in order to maintain a constant temperature of 300°. 300° has been found to be an optimal temperature as a balance of heating time and energy requirements, although with greater or lesser temperatures, less or more curing time will be required.

The temperature is maintained at about 300° for approximately 3 hours, at the end of which time the adhesive is cured, and the system may be turned off. It has been found that through the use of the thermostatic controls, during the heating cycle as many as 10 of the 12 lamps will be automatically turned off since only the two remaining lamps will be necessary to maintain the temperature within the chamber. This of course results in a substantial saving of electricity and thus reduces the operating cost.

Because of the air flow around the tires within the chamber, a very even heating has been found. Thermocouple tests have been run on this apparatus wherein a thermocouple was placed at an adhesive line on opposite sides of the tires, and on the opposite sides, the temperature has been found to vary only approximately plus or minus 2°. This evenness of heating gives a very good bond between the tread strip and the tire carcass, and thus an improved recapped tire is obtained.

Prior art apparatus has used high pressures within the chamber around the tires, but by using the apparatus of this invention which does not require elevated pressures, substantial savings are realized in terms of equipment costs and operating costs.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A process for retreading pneumatic tire casings with a prevulcanized rubber tread strip comprising:
    a. mounting a tire casing on a mounting rim,
    b. positioning a prevulcanized rubber tread strip around the circumference of said tire casing with a heat curable adhesive between said tread stripp and said tire casing,
    c. encircling the casing-tread strip in a one piece metal band pressure ring snugly engaging the tread strip and a portion of the side walls of the casing so that the tread strip is firmly positioned on the casing and no further clamping is required,
    d. inflating said tire casing to a pressure of at least about 25 psi within said pressure ring so that said tread strip is pressed against said tire casing,
    e. circulating air at a temperature of at least about 250°F and substantially atmospheric pressure around the periphery of the tire casing-pressure ring assembly and thereby curing said adhesive and bonding said tread strip to said casing.

2. A process as in claim 1 and including:
inflating said tire casing to about 100 psi.

3. A process as in claim 1 and wherein:
said heat curable adhesive comprises a strip of double-faced heat curable adhesive material interposed as a lamina.

4. A process as in claim 1 and wherein:
said air is at a temperature of less than about 320°F.

5. A process as in claim 1 and wherein:
said air is at a temperature of about 300°C.

6. A process as in claim 1 and including:
inflating said tire casing to a pressure of about 100 psi.

7. A process as in claim 3 and wherein:
said adhesive strip material is a heat vulcanizable material.

8. A process as in claim 1 and including:
a. placing said assembly in a curing vessel, and
b. circulating said air around the exterior and the side walls of said assembly.

9. A process as in claim 8 and including:
a. placing a plurality of said assemblies in a curing vessel in a vertically stacked orientation, and
b. spacing said assembliies vertically by means of a foraminous spacer ring positioned between superadjacent mounting rims.

10. A process as in claim 9 and including:
forcing said air in contact with a heater, vertically upwardly by the peripheries of said assemblies, laterally between said assemblies in contact with the tire side walls, and vertically downwardly through the centers of said assemblies in a cyclic path.

11. An apparatus for curing a heat curable adhesive for bonding a prevulcanized tread strip to a tire carcass and thereby retreading said tire carcass, said apparatus comprising:
    a. a generally cylindrical housing,
    b. said housing including insulated top and bottom members, and at least one intermediate member,
    c. said at least one intermediate member including concentric inner and outer walls having insulating means in the space therebetween, d. said top member comprising a cover for said housing,
e. said bottom member including blower means and heater means,
f. means for supporting a tire in said housing spaced above said bottom member, and
g. a one-piece metal band pressure ring for encircling said tread strip and said tire casing so as to snugly engage the tread strip and a portion of the side walls of the casing so that the tread strip is firmly positioned on the tire casing and no further support of the tread strip in said housing is necessary.

12. An apparatus as in claim 11 and wherein:
said heater means includes a plurality of heater elements.

13. An apparatus as in claim 12 and wherein:
the discharge from said blower means passes over said heater elements.

14. An apparatus as in claim 13 and wherein:
said supporting means comprises an annular directing element adjacent the intake of said blower means.

15. An apparatus as in claim 14 and wherein:
a. said blower means draws air in vertically downwardly and discharges air horizontally,
b. means directing the discharged air vertically upwardly around the periphery of a tire in said housing,
c. whereby the air discharged by said blower means travels in a cyclic path around said tire.

16. An apparatus as in claim 14 and wherein:
said housing includes a plurality of said intermediate members.

17. An apparatus as in claim 16 and wherein:
said housing includes at least one spacer ring for supporting tires in vertically spaced relationship.

18. An apparatus as in claim 17 and wherein:
said spacer rings are foraminous.

19. An apparatus as in claim 13 and wherein:
said heater elements comprise quartziodide lamps.

20. An apparatus as in claim 16 and wherein:
said intermediate members include alignment means for vertically aligning said members.

21. An apparatus as in claim 20 and wherein:
said alignment means includes alignment rings.

22. An apparatus as in claim 20 and wherein:
said alignment means includes tongue-and-groove means.

23. Apparatus for curing a heat curable adhesive for bonding a preformed prevulcanized tread strip to a tire carcass comprising:
a. a heating chamber,
b. means for supporting a tire carcass on a rim in said heating chamber,
c. a prevulcanized tread strip encircling said tire carcass and having a heat-curable adhesive between said tread strip and said tire carcass,
d. a one-piece metal band pressure ring encircling said tread strip and said tire carcass,
e. said tire being inflated to a pressure of at least normal operating pressure so that said pressure ring tightly encircles said tread strip and a portion of the side walls of said tire carcass so that said tread strip is firmly positioned on said tire carcass and no further support of said tread strip is necessary, and
f. means for circulating air around said tire carcass, said tread strip and said pressure ring.

24. Apparatus as in claim 23 and wherein:
said pressure ring includes portions extending from the running surface of the tire over a portion of each sidewall of the tire carcass.

25. Apparatus as in claim 23 and wherein:
said pressure ring completely encases said tread strip and a portion of the side walls of the tire carcass.

26. Apparatus as in claim 25 and wherein:
said pressure ring is a one piece member.

27. Apparatus as in claim 26 and including:
means for adjusting the diameter of said pressure ring.

28. Apparatus as in claim 27 and wherein:
said adjusting means includes locking means for locking the diameter of said pressure ring.

29. A pressure ring for encircling a tire carcass having a prevulcanized tread strip thereon with an adhesive layer between said carcass and said tread strip and for holding said tread strip in position on said carcass during a heating cycle for curing the adhesive and thereby bonding said tread strip to said carcass, said pressure ring comprising:
a. a one-piece thin metal band having a first portion conforming generally to the outer periphery of the tire tread strip assembly and second portions extending from said first portion over the edges of said tread strip, the edges of said adhesive layer and a portion of the side wall of the tire carcass.
b. the ends of said metal band being overlapped,
c. means for adjusting the diameter of said metal band,
d. means for locking said adjusting means,
e. said metal band snugly engaging the tread strip and a portion of the side walls of said tire tread strip assembly so that said tread strip is firmly positioned on said carcass and no further clamping of said assembly is required.

30. A pressure ring as in claim 29 and wherein:
a. said adjusting means includes chain means and sprocket means mounted on one of the ends of said steel band,
b. means for attaching said chain means to the other end of said steel band so that rotation of said sprocket means will tighten said chain means and vary the diameter of said pressure ring.

31. A pressure ring as in claim 30 and wherein:
a. said adjusting means further includes bracket means secured to said one of the ends of said steel band,
b. a shaft member mounted for rotation in said bracket means, and
c. said sprocket means being secured to said shaft member for rotation therewith.

32. A pressure ring as in claim 31 and wherein:
a. said locking means includes a socket member slideable on said shaft member,
b. a polygonal nut secured to said shaft member for rotation therewith,
c. a polygonal lug member concentric with said shaft member and secured to said bracket means so that said shaft member may rotate relative to said lug member,
d. said socket member having an internal configuration so as to be engageable with said lug member and said nut member so that said lug member and said nut member are non-rotatable with respect to each other when engaged by said socket member.

33. A pressure ring as in claim 32 and wherein:
a. said socket member is movable axially along said shaft member from a non-locking position out of engagement with said nut and lug members to a locking position in engagement with said nut and lug members.

34. A pressure ring as in claim 33 and wherein: said nut and lug members are hexagonal.

35. A pressure ring as in claim 34 and wherein: said socket member is a 12 point socket.

* * * * *